US00RE34834E

United States Patent [19]

Swanson

[11] E Patent Number: Re. 34,834

[45] Reissued Date of Patent: Jan. 24, 1995

[54] ICE COOLED BEVERAGE DISPENSER AND METHOD OF MAKING SAME

[75] Inventor: Craig A. Swanson, San Antonio, Tex.

[73] Assignee: IMI Cornelius Inc., Anoka, Minn.

[21] Appl. No.: 950,625

[22] Filed: Sep. 24, 1992

Related U.S. Patent Documents

Reissue of:

[64] Patent No.: 4,958,505
Issued: Sep. 25, 1990
Appl. No.: 180,513
Filed: Apr. 12, 1988

[51] Int. Cl.[6] ..... B67D 5/62

[52] U.S. Cl. ..... 62/398; 62/400; 222/146.6

[58] Field of Search ..... 62/396–400, 62/464, 463, 459, 529, 530; 222/146, 240

[56] References Cited

U.S. PATENT DOCUMENTS

| | | | |
|---|---|---|---|
| 1,607,347 | 11/1926 | Hemman | 62/398 |
| 1,943,938 | 1/1934 | Haydel | 62/398 |
| 2,673,005 | 3/1954 | Brown . | |
| 2,871,675 | 2/1959 | Cornelius | 62/389 |
| 4,291,546 | 9/1981 | Rodth | 62/398 |
| 4,651,538 | 3/1987 | Bull et al. | 62/398 |
| 4,676,405 | 6/1987 | Lents et al. | 222/108 |
| 4,678,104 | 7/1987 | Prichett | 222/146.6 |

*Primary Examiner*—John M. Sollecito
*Attorney, Agent, or Firm*—Sten Erik Hakanson

[57] ABSTRACT

An ice cooled beverage dispenser with a cold plate and a tubular ice bin liner has an upstanding rim around a periphery of the cold plate. The bottom edge of the liner is pressed into and seated to the rim, and an L-shaped bracket is fastened to the outside of the liner and to the rim for positive securement of the liner to the cold plate in a sanitary and leak proof manner; a method of making the beverage cooler is also provided.

14 Claims, 2 Drawing Sheets

ICE COOLED BEVERAGE DISPENSER AND METHOD OF MAKING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to the construction of an ice cooled beverage cooler and to a method of making an ice cooled beverage cooler.

2. The Prior Art

Beverage coolers having cold plates, ice bins, and thermal insulation have been in commercial use since the turn of the century. Specific examples of these prior devices are disclosed in the following patents 1943938 : W A Haydel
2673005 : C A Brown
2871675 : R T Cornelius
4651538 : R E Bull et al
4678104 : J D Prichett
4470522 : C M Lents et al Each of these patents discloses use of a cold plate with sealing of an ice bin to the top of the cold plate so that ice and melt water cannot seep under the cold plate and cause growth of algae, mold and the like. The devices shown in Brown and Cornelius have proven to be too costly to be economically viable. Haydel is unable to satisfy National Sanitation Foundation (NSF) criteria for approval. Bull and Prichett have rotocast plastic ice bins that are NSF approved but are plastic. There is a specific segment of the market which demands a stainless steel ice bin rather than plastic. Certain sanitation departments insist upon stainless steel iced bins, and certain soft drink components and fast food franchisers insist likewise.

OBJECTS OF THE INVENTION

It is an object of the present invention to provide a new method and apparatus wherein a metal liner is secured to a cast beverage cooling cold plate.

It is an object of the present invention to provide an ice cooled beverage dispenser with a cold plate and an ice bin having improved structure affixing the bin to the cold plate.

SUMMARY OF THE INVENTION

An ice cooled beverage dispenser has a cold plate, a tubular liner mounted atop the cold plate, an upright rim around the cold plate, a generally L-shaped bracket fastened to the liner and the cold plate, and a plurality of fasteners securing the flange to the plate.

In a beverage cooler having an ice cooled cold plate, the improvement of a tubular bin liner spaced above an upper ice supporting surface of the cold plate, with the liner being sealed and fastened to an upstanding rim around a perimeter of the cold plate.

A method of making a beverage cooler has the steps of providing a cast metal cold plate with an upstanding rim around the perimeter, inserting an upright tubular ice bin liner into the cold plate rim, seating the liner to the rim, and fastening the liner to the plate on the outside of the liner.

Many other advantages, features, and additional objects of the present invention will become manifest to those versed in the art upon making reference to the detailed description and accompanying drawings in which the preferred embodiment incorporating the principles of the present invention is set forth and shown by way of illustrative example.

DESCRIPTION OF THE PREFERRED EMBODIMENT

Figure 1:
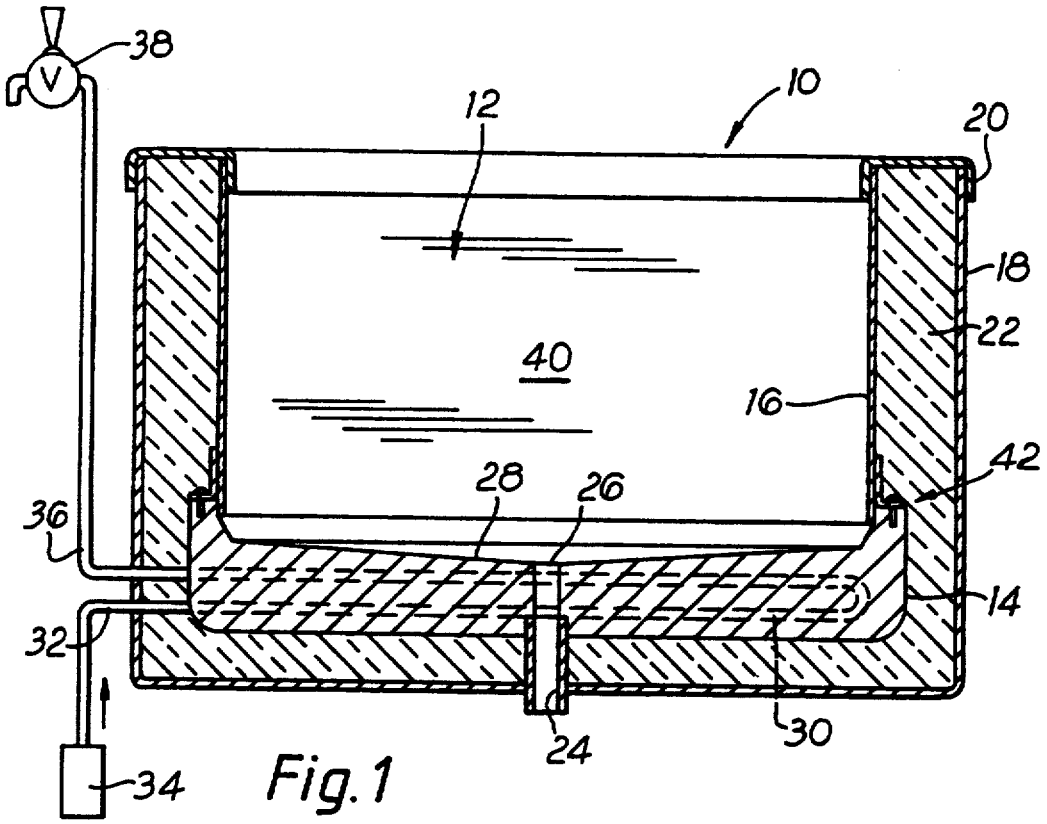
FIG. 1 is an elevational view, in section, through the preferred embodiment of an ice cooled beverage dispenser according to the present invention.

According to the principle of the present invention, an ice cooled beverage dispenser is provided as shown in FIG. 1 as generally indicated by the numeral 10. The dispenser 10 has an improved ice bin assembly, generally indicated by the numeral 12, which has a cold plate 14 and a tubular ice bin liner 16.

In the complete dispenser 10, the ice bin 12 is encased with an outer shell 18, a top breaker strip 20, and foamed in-situ thermal insulation 22. A drain fitting 24 extends out of the dispenser 10 from a recessed low point 26 of the upper surface 28 of the cold plate 14. The cold plate 14 has at least one and usually several internal cooling coils 30 directly under the upper surface 28. Each coil 30 has an inlet end 32 connectible to a source of beverage 34 and an outlet end 36 connectible to an appropriate dispensing valve 38. Within the volume jointly defined by the cold plate upper surface 28 and the liner 16 is the ice bin cavity 40 for containing a quantity of ice (not shown) to rest upon the cold plate 14 and provide cooling for beverage in and/or flowing through the cooling coils 30. All drain water from melted ice is voided out the drain fitting 24.

Figure 2:
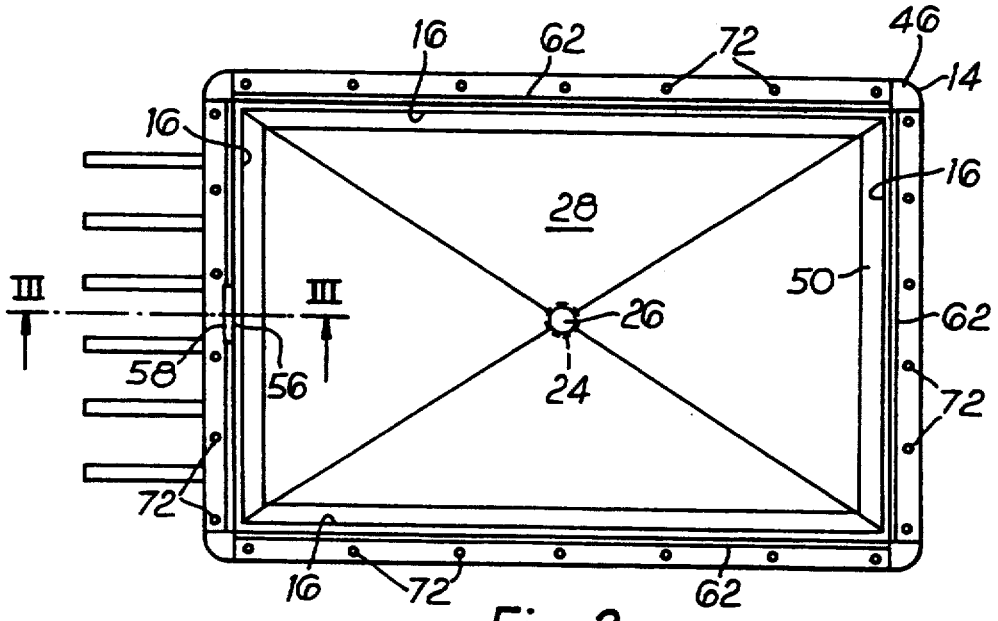
FIG. 2 is a top plan view of the cold plate and ice bin of the structure of FIG. 1.
Figure 3:
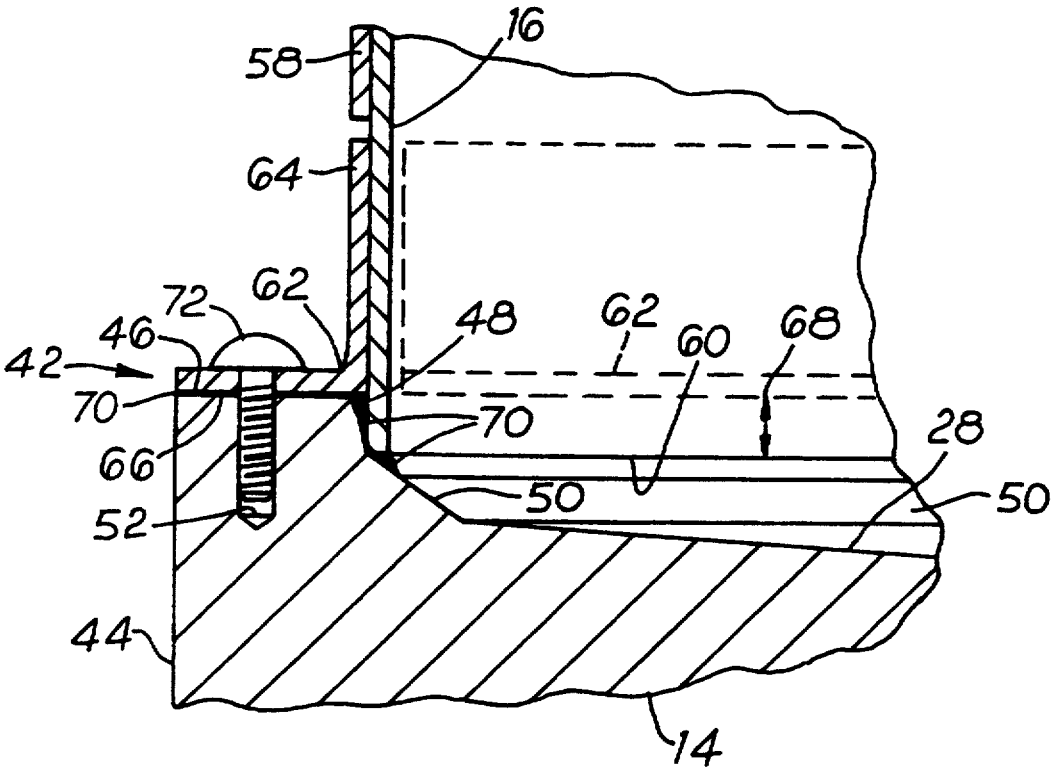
FIG. 3 is a detailed elevational sectional view through lines III—III of FIG. 2.

Important features of this invention are the method of making and the improved structure of the ice bin 12 as more fully shown and described with specificity in reference to FIGS. 2 & 3. The cold plate 14 is preferably cast aluminum of commercially grade high purity and thermal conductivity. The cold plate 14 has an upstanding rim generally indicated by the numeral 42 which extends completely around an outer perimeter 44 of the cold plate. The rim 42 has an upward facing annular mounting pad 46 which extends completely around the cold plate 14. Within the mounting pad 46 is a liner confinement ring 48 having an inward facing surface which is spaced upwardly from the cold plate upper surface 28. The surface of the ring 48 is preferably tapered; specifically it is larger on top and smaller at the bottom and is tapered inward toward the cold plate upper surface 28.

A preferred angle of taper on the ring 48 is at least four degrees from top to bottom. Below the ring 48 and spacing the ring 48 up from the cold plate upper surface 28 is an upward extending fillet so extending completely around the cold plate 14 between the ring 48 and the upper surface 28. A preferred fillet 50 is ¼ inch (6 mm) high by forty-five degrees with a sharp intersection to the ring 48 and a radiused intersection to the upper surface 28. A plurality of downward extending holes 52 are provided through the mounting pad 46 and into the rim 42.

The tubular liner 16 is preferably sheet metal and a preferred sheet metal is stainless steel sheet of about 0.020 inch (0.5 mm) thickness. The liner 16 is preferably formed of one piece of contiguous sheet with four 90 degree corner bends 54 as best seen in FIG. 2, and has a single upright seam 56 in one side where opposite ends of the liner 16 are abutted against each other. On the outside of the seam 56 is a metal backing strip 58 to which both ends of the liner 16 are spot welded to close the tubular liner 16. On the outside of each side of the liner 16 and adjacent a bottom edge 60 of the liner 16, is a generally L-shaped bracket 62 which extends around the outside of the liner 16. The L-shaped bracket 62 is preferably in four discrete sections, one on each side of the liner 16. The bracket 62 has an upright flange 64 extending upward and which is spot welded to the outside of the liner 16. The bracket 62 further has a generally horizontal and outward extending outboard flange 66 which is uniformly spaced upward from and above the liner bottom edge 60 all around the outer surface of the liner 16 at a constant vertical spacing 68.

In the assembly of the dispenser 10, the pre-assembled and spot welded liner 16 with the backing strip 58 and four brackets 62 is placed atop of the cold plate 14. A bead of sealant 70, such as silicone, is placed around the liner 16 at the convex corner between the outboard flange 66 and the outside of the liner 16 immediately above the liner bottom 60. The liner 16 and the bottom edge 60 fit inside of the mounting pad 46 and freely starts into tapered ring 48. However, the liner bottom edge 60 is larger than the bottom of the ring 48 and will not freely fall completely into the ring 48. A press (not shown) is utilized to compressively drive the liner 16 downward into the ring 48 until the liner bottom 60 abuts against the fillet 50 and the outboard flange 66 abuts against the mounting pad 46. Note that the height of the space 68 is identical to the height of the ring 48. The liner bottom edge 60 is a press-fit in the bottom of the ring 48 and provides a very tight and pre-loaded/-pre-stressed metal to metal contact between the liner 16 and cold plate 14. During the pressing of the liner 16 into the cold plate 14, the sealant 70 is squished around to form a complete sealing layer between the outboard flange 66 and mounting pad 46, between the liner 16 and the ring 48, and between the liner bottom edge 60 and the fillet 50. A plurality of rivet type fasteners 72, preferably drive screws, are then driven through the outboard flange 66 and into the fastener holes 52 in the cold plate rim 42 to permanently secure the liner 16 to the cold plate 14 in a fluid tightly sealed configuration. The thus assembled ice bin 12 is then placed in the outer shell 18 and the thermal insulation 22 is formed in-situ around the cold plate 14 and up and over rim 42 and outboard flanges 66 and to the outside of the liner 16 for further securement and stiffening of the liner 16 to the cold plate 14.

In the use and operation of the ice bin 12 and dispenser 10, a quantity of ice, usually ice cubes, is placed in the ice bin cavity 40. As beverage flows through the coils 30, the ice pressing against the cold plate upper surface 28 is melted to cool the beverage. As the ice melts, the melt water is voided out the drain 24. The liner bottom edge 60 is spaced well upward of the cold plate upper surface 28 so that the level of melt water on the plate upper surface 28 is always well below the liner 10. The liner 16 is very rigidly secured to the cold plate 14 and there is little or no probability of the sealant 70 being disturbed. The pre-stressed compression of the liner bottom edge 60 in metal-to-metal contact with the ring 48 further enhances the redundancy of the sealant 70. The abutment of the liner bottom edge 60 to the cold plate 14 is very reliably sealed, very sanitary and easily cleaned. There are no crevices for growth of algae, bacteria or mold.

This new and improved dispenser 10 satisfies all known sanitation codes, user criteria, and it is economically viable and competitive.

Although other advantages may be found and realized and various modifications may be suggested by those versed in the art, it should be understood that I wish to embody within the scope of the patent warranted hereon, all such embodiments as reasonably and properly come within the scope of my contribution to the art.

I claim:

1. An ice cooled beverage dispenser comprising (a) a cast metal cold plate having an upper surface for support of ice thereon in thermal exchange relationship, and at least one beverage coil through the plate, said coil having an inlet connectible to a source of beverage and an outlet connectible to a dispensing valve;

(b) a tubular liner mounted to said cold plate and extending upright therefrom, the interior surface of said liner and the upper surface of the cold plate jointly forming an ice bin atop of the cold plate;

(c) an upright cold plate rim around the perimeter of the cold plate upper surface and around the outside of a bottom edge of the liner, said rim being spaced upward of said upper surface;

(d) a generally L-shaped bracket having an upright flange fastened to the outside of the liner adjacent to said bottom edge, and an outboard flange extending outward from the liner; and (e) a plurality of spaced apart fasteners outside of said liner and through said outboard flange and into said upright rim, said fasteners securing said outboard flange to said rim, and thereby securing said liner bottom edge within said rim.

2. The dispenser of claim 1 in which said liner bottom edge is recessed downward into the interior of said rim, said outboard flange being atop the rim and being spaced upward from the liner bottom edge.

3. The dispenser of claim 2, in which said liner bottom edge is a press fit within said rim.

4. The dispenser of claim 1, in which said bottom edge is spaced upward above said cold plate upper surface.

5. The dispenser of claim 4, in which said cold plate has an inward extending fillet from said liner bottom edge to said cold plate upper surface.

6. The dispenser of claim 5, in which said liner bottom edge is abutted against said fillet.

7. The dispenser of claim 1, in which said liner is four sided and has a vertical seam between a pair of adjacent corners, said seam being backed by an upright metal strip extending upward outside of the seam and from the L-shaped bracket.

8. The dispenser of claim 1, including sealing compound between said rim, and said liner and said outboard flange.

9. The dispenser of claim 1, in which said bracket is on all sides of said liner, said upright flange extending upward from said outboard flange and being spot welded to said liner.

10. The dispenser of claim 1, including integral foamed in-situ thermal insulation extending under the cold plate, around the cold plate and up and over the rim and the outboard flange, and then upward along side the outer surface of the liner.

11. An ice cooled beverage dispenser, comprising:

a. a cast metal cold plate having a beverage circuit therethrough, the cold plate having an ice supporting surface and drain means located [generally centrally thereof] *therein*, and the cold plate having an upstanding rim extending around [the] *a* perimeter thereof above the ice supporting surface, *the rim having a top mounting pad surface and an inner ring surface depending downward from the top mounting pad surface to, and forming a sharp intersection with, a fillet surface, and the fillet surface depending downward from the intersection thereof with the inner ring surface to the cold plate ice supporting surface, and the ring surface being inclined at a relatively steep angle with respect to the ice supporting surface and the fillet surface being inclined at a relatively shallow angle with respect to the ice supporting surface for forming the sharp intersection between the ring and fillet surfaces;* b. a tubular ice bin liner, the liner having a bottom perimeter edge, *an outer surface* and an inner ice containing surface, the [bottom perimeter edge] *ice bin liner* secured to the upstanding rim for forming an ice [containing chamber and] *bin cavity wherein* the *liner* bottom *perimeter* edge [secured to the upstanding perimeter edge above the ice supporting surface] *is press fit within the upstanding rim so that a bottom perimeter portion of the bin outer surface is closely adjacent the inner ring surface and so that the bin bottom perimeter edge is positioned adjacent the intersection between the inner ring surface and the fillet surface.*

12. The improvement of claim 11 including a [fillet] *sealant* between the liner and the [plate upper] *ring* surface.

13. The improvement of claim 11, including a generally L-shaped bracket fastened to the [outside] *outer surface* of the liner, said bracket having an outboard flange spaced above [a] *the* bottom *perimeter* edge of the liner, said outboard flange being fastened directly to said cold plate rim.

14. The improvement of claim 13, in which the bracket is spot welded to the liner, and including a plurality of spaced apart rivets on the outside of the liner and extending downwardly through the outboard flange and downward into the rim, said rivets fastening the liner to the plate.

[15. The improvement of claim 11, in which said liner is a press fit within said cold plate rim.]

* * * * *